US007370037B2

(12) United States Patent
Doerre et al.

(10) Patent No.: US 7,370,037 B2
(45) Date of Patent: May 6, 2008

(54) METHODS FOR PROCESSING A TEXT SEARCH QUERY IN A COLLECTION OF DOCUMENTS

(75) Inventors: Jochen Doerre, Boeblingen (DE); Monika Matschke, Calw (DE); Roland Seiffert, Herrenberg (DE); Matthias Tschaffler, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 10/996,196

(22) Filed: Nov. 22, 2004

(65) Prior Publication Data

US 2005/0144160 A1    Jun. 30, 2005

(30) Foreign Application Priority Data

Dec. 29, 2003    (EP)    ................................. 03104988

(51) Int. Cl.
G06F 7/00 (2006.01)
G06F 17/00 (2006.01)
(52) U.S. Cl. ........................... 707/3; 707/101; 707/102
(58) Field of Classification Search .................. 707/3, 707/101, 102
See application file for complete search history.

(56) References Cited

U.S. PATENT DOCUMENTS 5,845,278 A * 12/1998 Kirsch et al. .................. 707/3
6,216,123 B1 * 4/2001 Robertson et al. ............. 707/3
6,999,959 B1 * 2/2006 Lawrence et al. ............. 707/5
2002/0023077 A1   2/2002 Nguyen et al.
2002/0073068 A1   6/2002 Guha
2003/0078913 A1 * 4/2003 McGreevy ..................... 707/3

* cited by examiner

Primary Examiner—Tim Vo
Assistant Examiner—Kabir Jahangir
(74) Attorney, Agent, or Firm—Mollborn Patents; Fredrik Mollborn

(57) ABSTRACT

A method, system, and computer program product are provided for processing a text search query in a collection of documents. A full posting index is generated. The full posting index comprises one or more first index terms and a full posting list for each first index term, enumerating occurrences of the first index term in the documents of the collection. A text search query comprises search conditions on search terms. These search conditions are translated into conditions on the search terms to provide translated conditions. At least one short posting index is generated. The short posting index comprises one or more second index terms and a short posting list for each second index term, enumerating the documents in which the second index term occurs. Filter conditions and complementary conditions to represent the full content of the translated conditions are generated, wherein the filter conditions approximate the translated conditions. The filter conditions are processed using the short posting index and the complementary conditions are processed using the full posting index to provide a query result.

12 Claims, 4 Drawing Sheets

METHODS FOR PROCESSING A TEXT SEARCH QUERY IN A COLLECTION OF DOCUMENTS

CROSS-REFERENCE TO RELATED APPLICATIONS

This patent application claims benefit under 35 USC § 119 (e) to Application no. 03104988.5, filed in the European Patent Office on Dec. 29, 2003 by International Business Machines Corporation titled "Method and Infrastructure for Processing a Text Search Query in a Collection of Documents" which is hereby incorporated herein by reference in its entirety.

BACKGROUND OF THE INVENTION 1.0 Field of the Invention

The present invention relates to a method, system and computer program product implementing the method, for processing text search queries in a collection of documents.

2.0 Description of the Related Art

The purpose of a text search query is typically to find those documents in a collection of documents that fulfill certain criteria, called search conditions, such as those documents which contain certain words. In many cases, the "relevance" of documents fulfilling the given search conditions has to be calculated as well. Most often, users are only interested in seeing the "best" documents that result from a text search query. As the size of document collections to be searched is constantly increasing, the efficiency of text search query processing becomes an ever more important issue.

Text search query processing for a fulltext search is typically based on "inverted indexes". To generate inverted indexes for a collection of documents, all documents are analyzed to identify the occurring words or search terms as index terms together with their positions in the documents. In an "inversion step" this information is basically sorted so that the index term becomes the first order criteria. The result is stored in a full posting index comprising the set of index terms and a full posting list for each index term of the set. The posting list of an index term enumerates all occurrences of the index term in all documents of the collection.

FIG. 1 illustrates an example of a collection of documents 100 and a corresponding full posting index 200. The collection of documents 100 comprises three text documents doc1, doc2 and doc3. For simplicity, FIG. 1 does not show the fulltext of each document but only sequences of index terms a, b, c and d representing the occurrences of the index terms a, b, c and d in the fulltext of the corresponding document.

The index terms a, b, c and d form the set of index terms which the full posting index 200 is based on. It comprises a full posting list for each index term a, b, c and d, enumerating all occurrences of the corresponding index term in all documents doc1, doc2 and doc3 of the collection. In the example described herein, the occurrences of an index term are grouped by document. Typically, the posting lists are coded and compressed for storing.

The full posting index 200 can be used to process a query, for example, the query "find all documents containing the phrase 'a'". Therefore, the search engine looks up all positions for "a" and all positions for "b". Then, the conditions whether "a" and "b" occur in the same document and whether "b" occurs in the position immediately after "a" are checked.

One issue associated with full posting indexes is that they tend to become very large. Even by applying appropriate compression techniques, a full posting index can easily be about 50 to 100% of the size of the original text document collection that has been indexed.

The overall runtime of text search query processing is mainly dominated by two factors, namely reading the corresponding index posting lists from disk and finding the next possible match in a posting list. For example, if "a" was found in document 2576, then the search engine should skip in the posting list of "b" to this document. Then a match is indicated if document 2576 is mentioned in the posting list of "b". Otherwise if that position does not exist, no match was found. In some text search query processing techniques, necessary for processing this next( ) operation is the decompression and decoding of the posting lists.

The generation of additional access structures to posting lists, which allow relevant parts of long posting lists to be quickly addressed, is well-known. Therefore, the posting lists are no longer considered pure sequential data streams, but a sequence of indexed blocks. Thus, the irrelevant parts of a posting list can easily be skipped by addressing only blocks comprising the relevant parts of the posting list. In some cases, this selective addressing of pre-determined parts of a posting list can enhance the query performance dramatically. For example, the text search query "find all documents containing 'A' and 'B'" will be processed. 'A' is a very rare term in the collection of documents, while 'B' is a frequent term. 'A' occurs only in documents 57, 23456 and 123456, while 'B' occurs in every 10th document on average. In this case it is advantageous to look up the occurrences of 'A', first. By using the additional access structure to the posting list of 'B', it is then possible to address directly those blocks of the posting list for 'B' that cover a range containing one of the occurrences of 'A'. This processing saves I/O and decoding/matching expense for most of the occurrences in the posting list of 'B'.

As exemplified, the use of additional access structures to long posting lists can improve query performance dramatically for those queries comprising at least some pretty restrictive condition. However, in cases in which all participating terms have a relatively high frequency, the approach does not help, since virtually any block in any posting list related to the search terms contains a hit candidate and needs to be examined.

SUMMARY OF THE INVENTION

Starting from this, an object of the present invention is to improve the efficiency of processing text search queries in a collection of documents.

The foregoing object is achieved by various embodiments of a method, system and computer program product implementing the method, as set forth in the independent claims. Further advantageous embodiments of the present invention are described in the dependent claims and are taught in the following description.

According to the various embodiments of the present invention, a method, system and computer program product, are provided for processing text search queries in a collection of documents. A text search query comprises one or more search conditions on one or more search terms. A full posting index is generated for the documents of the collection. The full posting index comprises one or more first index terms and a full posting list for the first index terms. The full posting list enumerates the occurrences of the one or more first index terms in the documents of the collection.

One or more search conditions of a given query are translated into one or more conditions on the one or more first index terms. In addition to the full posting index at least one short posting index is generated for the documents of the collection. The short posting index comprises one or more second index terms and a short posting list for each second index term. The short posting list enumerates the documents in which the one or more second index terms occurs. The one or more translated conditions of the text search query are optimized by generating one or more filter conditions and one or more complementary conditions to represent the full content of the one or more translated conditions, wherein the one or more filter conditions approximate the one or more translated conditions. To process the text search query the one or more filter conditions are processed using the short posting index and the one or more complementary conditions are processed using the full posting index.

A further object of the present invention is to provide an embodiment of a system for processing a text search query according to the method described above. In various embodiments, a system processes a text search query in a collection of documents. The system comprises a full posting index for the documents of the collection. The full posting index comprises a first set of index terms and a full posting list for each index term of the first set. The full posting list enumerates occurrences of the index term in the documents of the collection. The system also has one or more search conditions on search terms of a text search query that are translated into one or more conditions on the index terms of the first set to provide one or more translated conditions. The system also comprises a short posting index for the documents of the collection. The short posting index comprises a second set of index terms and a short posting list for the index terms of the second set. The short posting list enumerates the documents in which the index term of the second set occurs. The system also comprises one or more filter conditions, comprising one or more Boolean conditions, and one or more complementary conditions to represent the full content of the translated conditions. The filter conditions approximate the translated conditions and can be processed using only the short posting index. The system comprises a query result based on the short posting index, the one or more filter conditions, the full posting index and the one or more complementary conditions.

Therefore, various embodiments of the present invention provide a significant reduction in the overall expense for processing search conditions which do not require positional information about the corresponding index terms, and thus provide an opportunity to improve the performance of many text search queries.

BRIEF DESCRIPTION OF THE DRAWINGS

The novel features of the present invention are set forth in the appended claims. These features, additional objects and advantages of the present invention as well as preferred modes of use will be apparent and best understood by reference to the following detailed description of illustrative embodiments, when read in conjunction with the accompanying drawings, in which:

DETAILED DESCRIPTION

Figure 1:
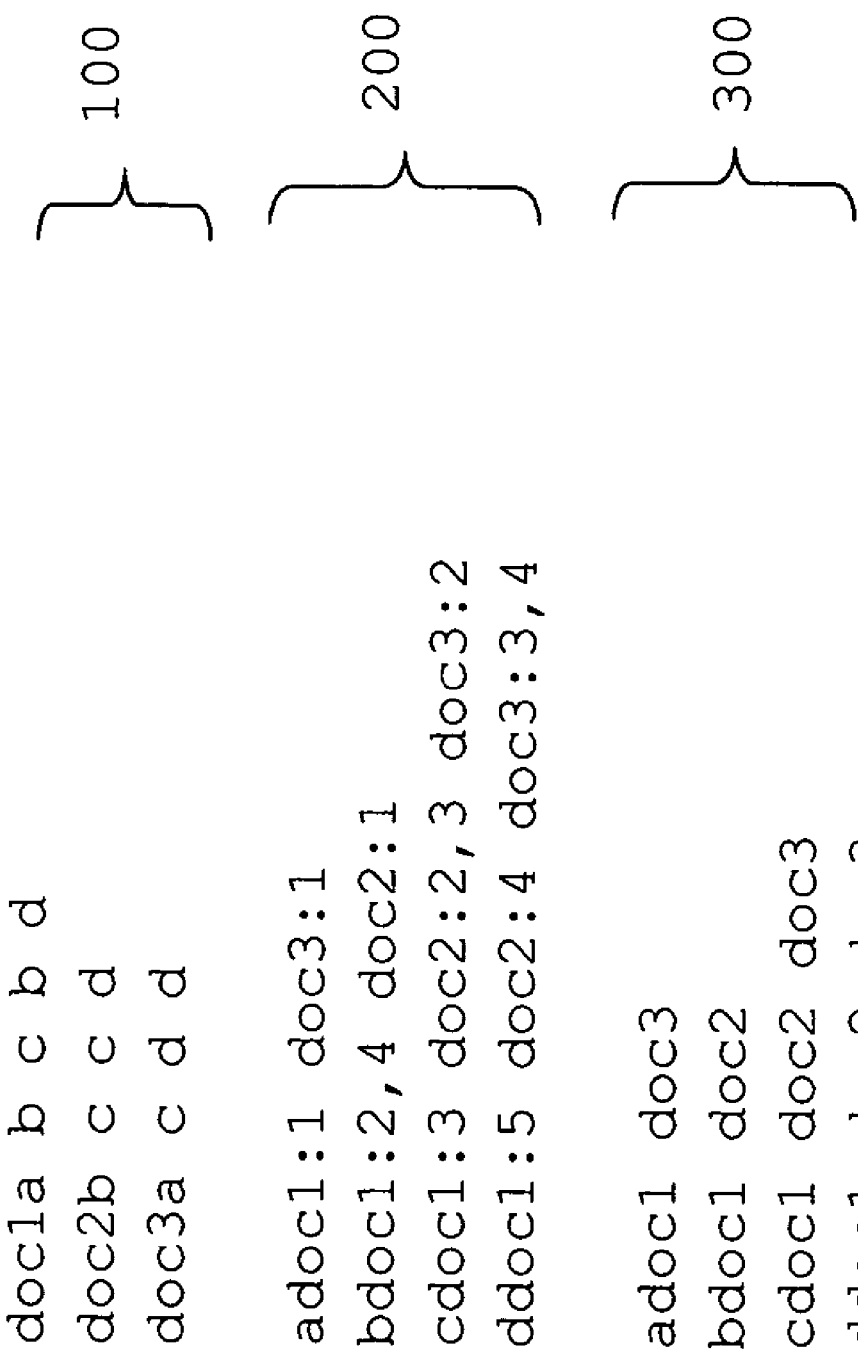
FIG. 1 depicts an example of a collection of documents together with a full posting index for this collection of documents and a short posting index generated in accordance with an embodiment of the present invention.

According to the various embodiments of the present invention, a method, system and computer program product, are provided for processing text search queries in a collection of documents. A text search query comprises one or more search conditions on one or more search terms. A full posting index is generated for the documents of the collection. The full posting index comprises a set of index terms and a full posting list for each index term of the set. The full posting list enumerates all occurrences of the index term in all documents of the collection. One or more search conditions of a given query are translated into one or more conditions on the index terms. In addition to the full posting index at least one short posting index is generated for the documents of the collection. The short posting index comprises a set of index terms and a short posting list for each index term of the set, enumerating the documents in which the index term occurs. The one or more translated conditions of the text search query are optimized by generating one or more filter conditions and one or more complementary conditions to represent the full content of the one or more translated conditions. The one or more filter conditions approximate the one or more translated conditions and can be processed using only the short posting index. For processing the text search query the one or more filter conditions are processed using the short posting index and the one or more complementary conditions are processed using the full posting index.

Starting from the recognition that some of the more important search conditions, for example, Boolean conditions, do not require all of the information of the full posting index, various embodiments of the present invention propose to generate an additional index structure comprising no positional information, and therefore far less information than the full posting index. This additional so-called short posting index allows these kinds of search conditions to be processed very quickly. Reading a short posting index from disk is significantly faster than reading the full posting index because less data has to be transferred in I/O operations. Also, in some embodiments, the processing of next( ) operations, as described above, is significantly easier when using a short posting index because the actual occurrences within a document do not need to be decoded.

In some embodiments, the short posting index comprises only a subset of the information stored in the full posting index, namely a list of documents for each index term. In various embodiments, depending on the kind of search condition which the short posting index will be applied to, it may also comprise additional index terms and corresponding short posting lists and/or additional specific information about the index terms calculated from the full posting index, for example, the number of occurrences for each document of the list. In any case, the short posting index should only "slightly" increase the overall index size of a given collection of documents. The actual increase in overall index size will depend on many factors, for example, the compression chosen, the index content, the language and type of the text documents to be indexed, etc. This increase in index size is a small price compared to the tremendous performance gain achieved by using the short posting index.

In various embodiments, as indicated above, the short posting index may be designed to apply to special search conditions. Therefore, in some embodiments, the set of index terms of the short posting index may comprise pre-computed subqueries representing these special search conditions, for example, subqueries for single words or phrases as well as proximity conditions and/or field conditions. Thus, the set of index terms of the short posting index may be much larger than the set of index terms of the full posting index.

Various embodiments may use different techniques for selecting a set of index terms for the short posting index. One possible technique is to consider the expense for computing a sub-query as part of a text search query and choose only expensive sub-queries as index terms. Then, a corresponding search condition can easily be processed without expensive computing but by accessing the short posting index. Another possible technique is the evaluation of previous text search queries to estimate the frequency of special search conditions and the corresponding processing time to identify expensive sub-queries.

In some embodiments, when processing a text search query it is often advantageous if the full posting lists of the full posting index are considered as a sequence of indexed blocks to quickly address defined parts of the full posting lists. This applies also to the short posting lists of a short posting index, which may also be considered as a sequence of indexed blocks.

In a very advantageous embodiment of the present invention, a filter of one or more Boolean conditions is generated when optimizing the one or more translated conditions of a given text search query. As mentioned above, this filter of Boolean conditions can be processed very efficiently by using the short posting index. This results in a reduced set of documents still to be searched. Thus, the relevant parts of the full posting index can easily be identified to access only these relevant parts of the full posting index, when processing the complementary conditions of the text search query.

Furthermore, in additional embodiments, a short posting index is used for ranking the resulting documents of a given text search query.

Commonly used ranking or scoring algorithms for text search take into account the frequency of an index term in a document or the weighted frequency, which means the frequency of the index term in an important part of the document, for example, the title or the abstract. Another important aspect for ranking is the overall number of occurrences of the index term in the collection, wherein very general terms are less significant. In various embodiments, this information is available for score computation.

According to one embodiment of the present invention, the short posting index can be used to reduce the set of documents fulfilling the whole conditions of a given text search query and, thus, to identify the relevant parts of the full posting index. Then, it is possible to access only these relevant parts to extract the information needed for the ranking algorithm, for example, for calculating the weighted and/or unweighted index term frequencies.

In another embodiment of the present invention, the short posting index is designed to support ranking algorithms which take into account proximity conditions which are index terms of the short posting index.

Yet another embodiment of the present invention uses a short posting index designed to support a ranking algorithm, which uses information about the weighted and/or unweighted index term frequency in each document of the collection. Therefore, a short posting index is generated, stored and updated for each document added to the collection. The short posting index comprises a set of index terms and a short posting list for each index term of the set, enumerating the documents in which the index term occurs, and information about the weighted and/or unweighted index term frequency in each document of the collection.

A further object of the present invention is to provide an embodiment of a system for processing a text search query according to the method described above. In various embodiments, a computer system processes a text search query in a collection of documents. The system comprises a full posting index for the documents of the collection. The full posting index comprises a first set of index terms and a full posting list for each index term of the first set. The full posting list enumerates occurrences of the index term in the documents of the collection. The system also has one or more search conditions on search terms of a text search query that are translated into one or more conditions on the index terms of the first set to provide one or more translated conditions. The system also comprises a short posting index for the documents of the collection. The short posting index comprises a second set of index terms and a short posting list for the index terms of the second set. The short posting list enumerates the documents in which the index term of the second set occurs. The system also comprises one or more filter conditions, comprising one or more Boolean conditions, and one or more complementary conditions to represent the full content of the translated conditions. The filter conditions approximate the translated conditions and can be processed using only the short posting index. The system comprises a query result based on the short posting index, the one or more filter conditions, the full posting index and the one or more complementary conditions.

In some embodiments, a system comprises means for generating and storing a full posting index and updating the full posting index for each document added to the collection. The full posting index comprises a set of index terms and a full posting list for each index term of the set. The full posting list enumerates all occurrences of the index term in all documents of the collection. The system also comprises means for translating the search conditions on search terms of a given text search query into conditions on the index terms. According to some embodiments of the invention, there are means for generating and storing a short posting index and updating the short posting index for each document added to the collection. The short posting index comprises a set of index terms and a short posting list for each index term of the set. The short posting list enumerates the documents in which the index term occurs. Furthermore, there are means for optimizing the translated conditions of a given text search query by generating filter conditions, especially Boolean conditions, and complementary conditions to represent the full content of the translated conditions. The filter conditions approximate the translated conditions and can be processed using only the short posting index. An executor, which is another component of the system, uses the short posting index to process the filter conditions and uses the full posting index to process the complementary conditions.

In another advantageous embodiment of the present invention, the system further comprises means to access only predefined parts of the full posting index.

In a further embodiment of the present invention, the system also comprises means to calculate the weighted and/or unweighted index term frequency in each document of the collection and to include this information in a short posting index.

As already described in connection with the background of the invention, in FIG. 1, the collection of documents 100 comprises three text documents doc1, doc2 and doc3, containing the index terms a, b, c and d. The full posting index 200 is based on these index terms a, b, c and d and comprises a full posting list for each of these index terms a, b, c and d, enumerating all occurrences of the corresponding index term in all documents doc1, doc2 and doc3 of the collection 100.

According to various embodiment of the invention, a short posting index 300 is generated in addition to the full posting index 200. Similar to the full posting index 200, the short posting index 300 is an inverted index and, thus, based on a set of index terms. In this example, the full posting index 200 and the short posting index 300 use the same set of index terms a, b, c and d. However, it should be mentioned here, that this is only one possible embodiment the present invention. In many cases the short posting index will be based on a much larger set of index terms than the full posting index. The short posting index 300 comprises a short posting list for each index term a, b, c and d, enumerating only the documents in which the index term occurs.

The short posting index 300 can be used to process search conditions of a given text search query, which do not require positional information about the corresponding search terms. One important example for these kind of search conditions is the class of Boolean conditions, which means AND, OR, . . . queries. The short posting index 300 allows those queries to be answered without accessing the full posting index 200.

Since the search engine has to be able to process all kinds of queries, the full posting index 200 can not be eliminated. The overhead introduced by adding a redundant short posting index 300 should be minimal.

In another advantageous embodiment of the present invention, there are additional access structures to the full posting lists and to the short posting lists. Each posting list is considered as a sequence of indexed blocks that allow that part of the posting list which is expected to be relevant for a given text search query to be quickly addresses. Thus, the irrelevant parts of the posting list can be skipped without processing them. In some embodiments, these additional access structures are the basic requirement for a preferred variant of the present invention using Boolean conditions as a filter to reduce expensive access to the full posting index.

This kind of processing will be explained by the following example of a text search query for "ibm server hardware", wherein this phrase condition already represents the translated condition of the query. According to various embodiments of the present invention, the following filter conditions:

"ibm" AND "server" AND "hardware"

are generated to approximate the phrase condition in question. These Boolean conditions can easily be processed by using only the short posting index. The result is a significantly reduced set of candidates which definitively contain all three terms "ibm", "server" and "hardware". Only then, the search engine computes the phrase matching as complementary condition by accessing the full posting index to check the positional information stored in the full posting lists. This access can now be restricted to blocks that actually contain candidates by using the result of the foregoing filtering.

This approach, using the Boolean conditions AND, OR as a filter, can be generalised as shown in following list:

| Search Conditions | translated conditions | → optimized conditions: filter conditions AND (complementary conditions) |
|---|---|---|
| Single words: | A AND B | → short(A) AND short(B) |
| | | Only needs to access short posting index - the filter conditions represent the full search conditions, thus, no complementary conditions needed |
| Phrase: | PHRASE(A,B) | → short(A) AND short(B) AND (full(A)NEAR[1,ordered]full(B)) |
| | | PHRASE(A,B) uses short posting index to process AND(A,B) to reduce access to full posting index for evaluation of phrase condition |
| Proximity: | A NEAR[n,_] B | → short(A) AND short(B) AND (full(A)NEAR[n,_]full(B)) |
| | | A NEAR[n,_] B uses short posting index to process AND(A,B) to reduce access to full posting index for evaluation of proximity condition |

In some embodiments, a further optimization of this approach can be achieved by pre-computing special sub-queries, as proximity conditions, and storing them in the short posting index. This short posting information can then be used as a filter for more specific proximity conditions.

In the following example, the short posting index comprises pair postings for an index term called pair5(A,B). The corresponding short posting list is the result of a pre-computed sub-query for pairs of tokens A and B, occurring in a window of five or less tokens. This information can now be used for processing, for example, the query condition PHRASE(A,B). First, the short posting list of the index term pair5(A,B) is used to obtain matches in a window of 5. Thus, the access to the full posting index for evaluation of the phrase condition can be reduced significantly. This processing can be expressed as:

PHRASE(A,B)→pair5(A,B) AND (full(A)NEAR[1, ordered]full(B))

Figure 2:
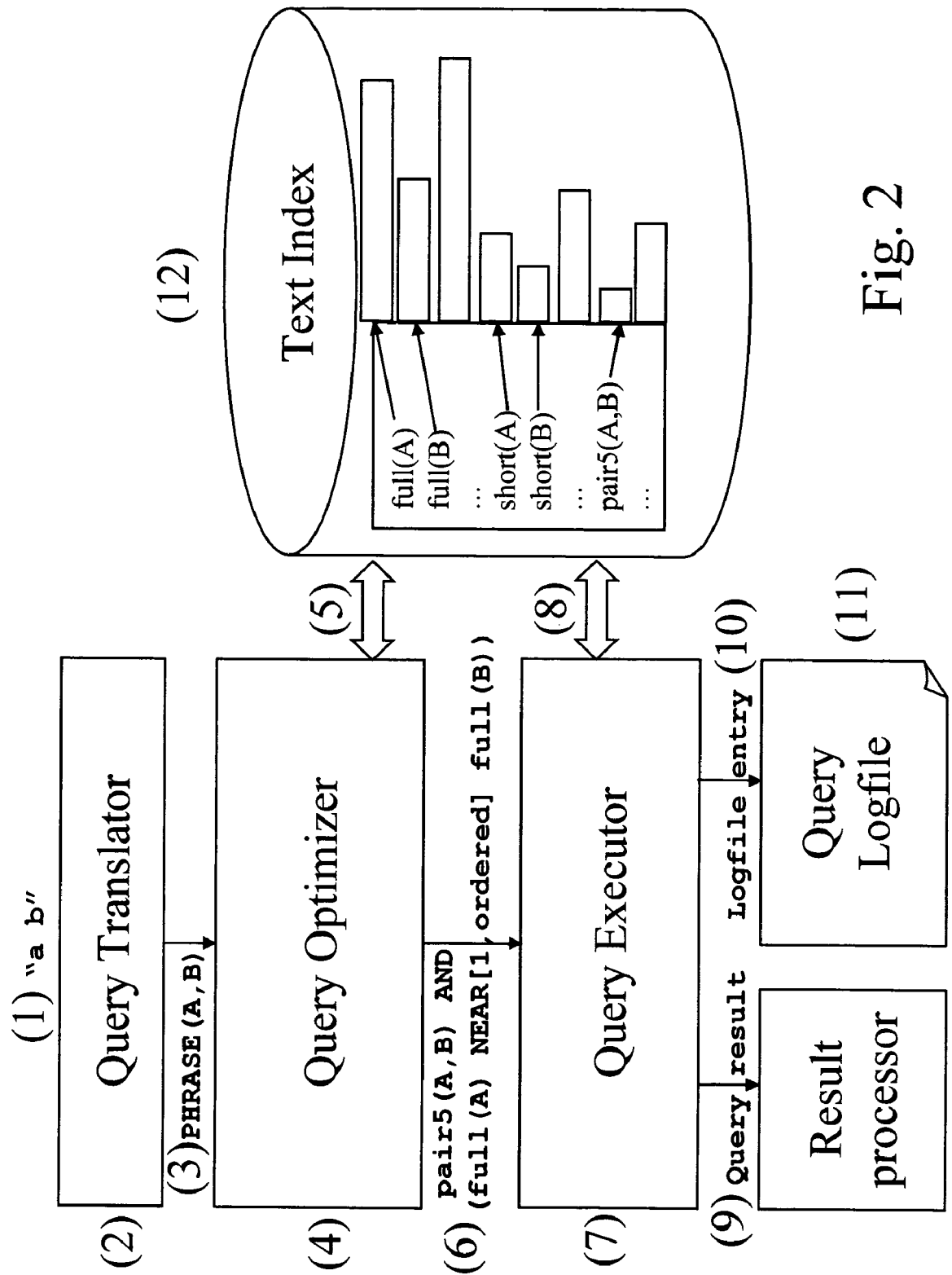
FIG. 2 depicts a diagram of the components of a system for processing a text search query in accordance with an embodiment of the present invention.
Figure 3:
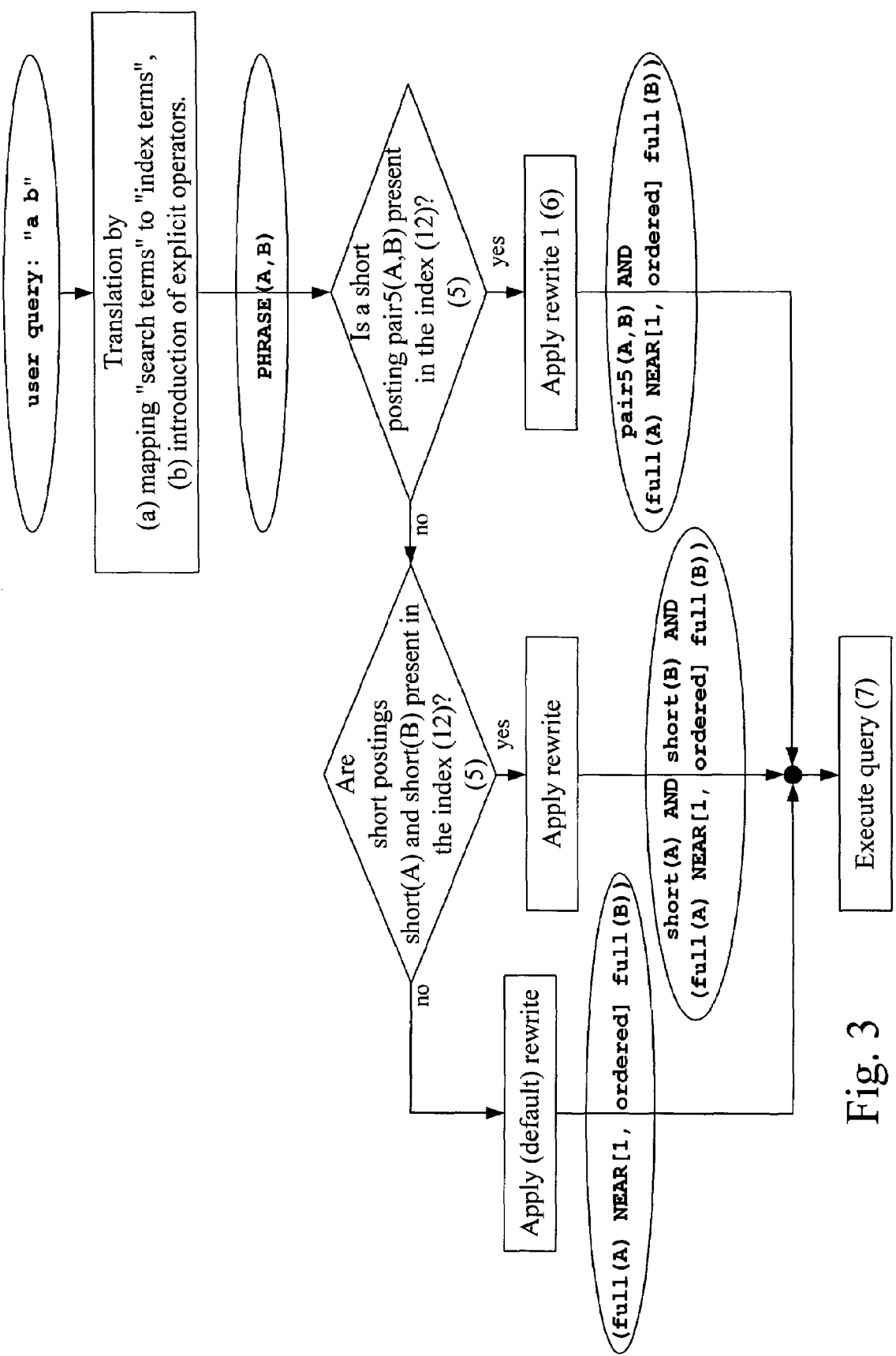
FIG. 3 depicts a flowchart for processing a text search query in accordance with an embodiment of the present invention.

As mentioned above, FIG. 2 depicts a diagram of the components of a system necessary for processing a text search query according to an embodiment of the present invention. The diagram of FIG. 2 is related to FIG. 3 which depicts a flow chart of an embodiment for processing the text search query "a b" to illustrate some aspects of the present invention.

In a first step, the text search query 1 "a b", coming from a user, is translated by a query translator 2. Therefore, the search terms, used by the user, are mapped to index terms of the full posting index, for example, by reducing words to their stems and by ignoring case information. In addition, explicit operators are introduced by translating the original search conditions. In the example described herein, this results in the translated condition 3 PHRASE(A,B) which has to be optimized by a query optimizer 4. Before generating filter conditions, the query optimizer 4 checks in step 5, what kind of short posting indexes are available in the text index 12. Only then, the query optimizer 4 can generate filter conditions approximating the translated condition PHRASE (A,B). If a short posting index comprising pair5(A,B) postings is present, then the condition PHRASE(A,B) can be rewritten as a combination 6 of the filter condition pair5(A, B) and the complementary condition (full(A) NEAR[1, ordered] full(B)). The filter condition pair5(A,B) represents a very good approximation of the condition PHRASE(A,B). If the short posting index only comprises short postings short(A) and short(B), then the condition PHRASE(A,B) can be rewritten as a combination of the filter conditions short(A) AND short(B) and the complementary condition (full(A) NEAR[1,ordered] full(B)). The filter conditions short(A) AND short(B) are weaker than the filter condition pair5(A,B). That is the reason why the latter is preferred. If no short posting index is available, it is not possible to generate a filter condition according to the invention. Then, the rewriting of the condition PHRASE(A,B) results in the remaining complementary condition (full(A) NEAR[1,ordered] full(B)) which can only be processed by using the full posting index. After having generated the filter conditions, if possible, and the complementary conditions, a query executor 7 processes the filter conditions by using only the corresponding short posting index and the complementary conditions using the full posting index, what is indicated by arrow 8. The query result 9 is transmitted to a result processor, while a log file entry 10 is transmitted to a query logfile 11.

In various embodiments, in order to limit the number of short posting index terms, only subqueries which are expensive to compute during query processing are, or should be, included in the short posting index. A NEAR condition is expensive to compute, if at least one of the terms has a very high frequency and the other term has at least medium to high frequency. However, the number of these terms is not too high. Even in a large index, for example, 50 GB text indexed, only thousands of terms have a very high frequency, whereas the overall number of index terms may easily be ten millsion. Therefore, the introduction of pair postings restricted in this way only roughly doubles the number of index terms, which is quite manageable.

In some embodiments, another approach to limit the number of short posting index terms is to base the selection of index terms on an evaluation of previous text search queries. If available, a query log can be analysed. Thus, for example, the frequency of co-occurring terms can be measured together with the execution time needed. Pairs showing "critical" behaviour can be added to the short posting index the next time this index is updated. In this approach all kinds of sub-queries having a poor performance can be identified and included in the short posting index. This results in a self improving system.

Once again, it should be pointed out here, that the short posting lists are very small compared with the full posting lists, which are needed anyway. That is the reason why even additional short postings for special, restricted pre-computed conditions add only very limited data to the overall index structure.

Figure 4:
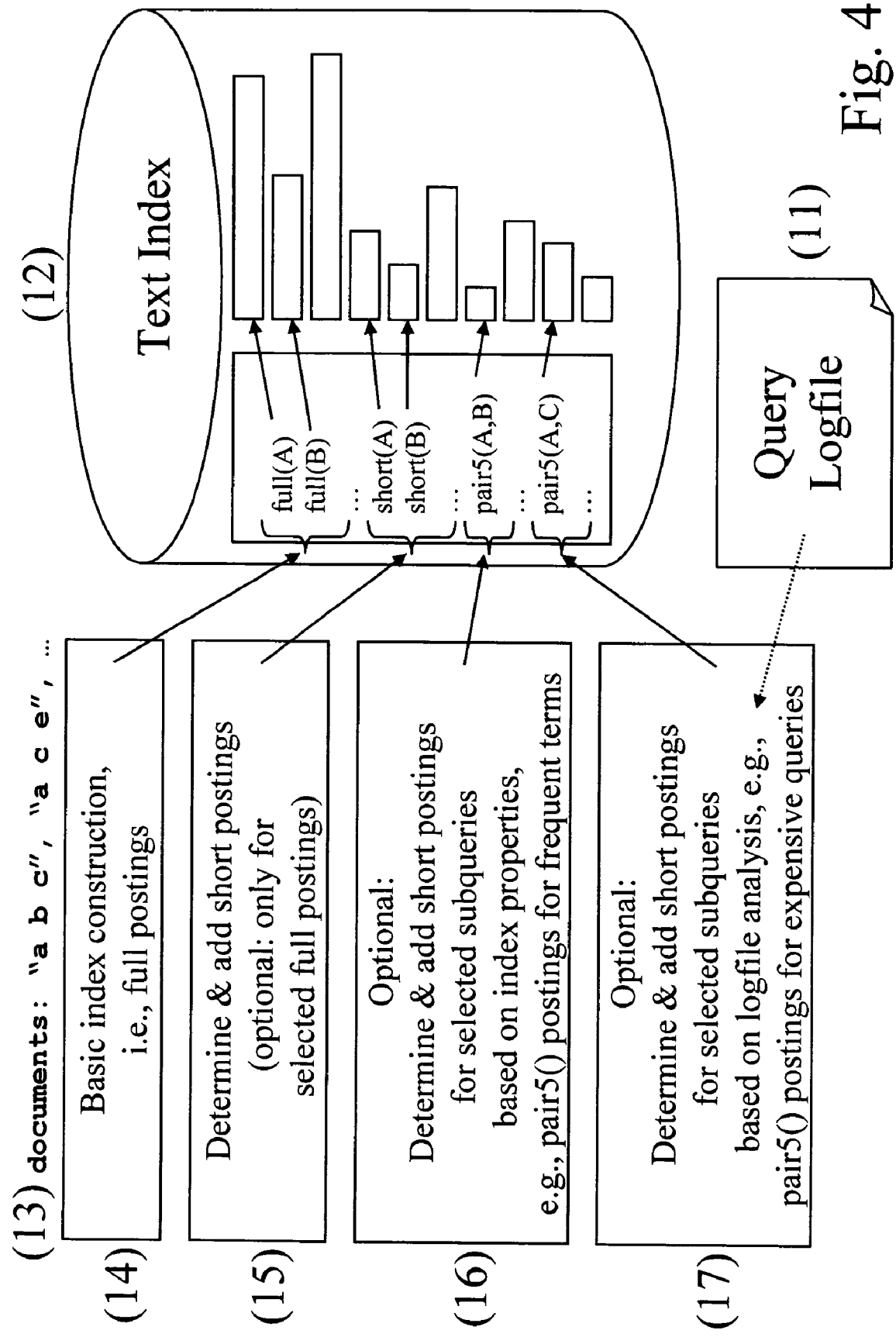
FIG. 4 depicts a diagram of the components of an embodiment of a system for generating, storing and updating a text index comprising a full posting index and several short posting indexes.

FIG. 4 depicts components 14 to 17 of an embodiment for generating, storing and updating a text index 12 comprising a full posting index and several short posting indexes for a collection 13 of documents. A first component 14 is responsible for a basic index construction, that is, for generating and storing a full posting index, and updating the full posting index for each document added to the collection. The full posting index comprises a set of index terms and a full posting list for each index term of the set, enumerating all occurrences of the index term in all documents of the collection. A second component 15 is responsible for generating and storing a short posting index, and updating the short posting index for each document added to the collection. The short posting index comprises a set of index terms and a short posting list for each index term of the set, enumerating the documents in which the index term occurs. It should be mentioned here, that it is also possible to determine short postings only for selected full postings. Component 16 determines and adds short postings for selected subqueries based on index properties, for example, pair5( ) postings for frequent terms, whereas component 17 determines and adds short postings for selected subqueries based on logfile analysis, for example, pair5( ) postings for expensive queries.

In various embodiments, another aspect of processing a text search query is the ranking of the resulting documents. There are ranking algorithms which take into account so-called "lexical affinities" (LA). The underlying idea is that if terms occur close together, for example, within a window of five, then this indicates a more relevant hit than if the terms occur far apart. Therefore, in a ranked context, a simple query such as:

"A AND B AND C"

becomes:

"(A AND B AND C) and (true OR LA(AB) OR LA(AC) OR LA(BC))"

in which each component of the query contributes to a score.

In some embodiments, in practice, LAs, that is, NEAR conditions, have to be computed for all ranked queries. In order to improve performance, these NEAR conditions or at least the expensive NEAR conditions can be pre-computed and included in the short posting index. These LA postings can also be used as pretty strict filter conditions for phrase processing.

As mentioned above, commonly used ranking algorithms for text search queries take into account the frequency or weighted frequency of an index term in a document and the overall number of occurrences of the index term in the collection. This information can be obtained by counting the actual occurrences of an index term for hit documents in the corresponding full posting lists.

Various embodiments of the present invention provide two approaches to obtain the ranking information in question by restricting the access to the full posting index as much as possible. The first approach will be explained for the ranked query "A AND B". This ranked query can be re-written as follows:

"A AND B"➔"(short(A) AND short(B)) AND (full(A) AND full(B))"

By using the short posting index to calculate the first AND condition, the access to the full posting index to obtain the ranking information can be reduced to the much smaller set of documents that already satisfy the AND condition.

In some embodiments, in the more general case of arbitrary queries it has to be certain that the query re-writer/optimizer adds access to all full posting lists that are not part of the query for other reasons in addition.

Now, the following more complex example shall be considered:

| A AND PHRASE(B,C) | |
|---|---|
| =(standard re-write)=> | short(A) AND short(B) AND short(C) AND (full(B)NEAR[1,ordered]full(C)) |
| =(ranking re-write)=> | (short(A) AND short(B) AND short(C) AND (full(B)NEAR[1,ordered]full(C))) OR full(A) |

In general the re-write uses the following rule:

| Original Query[A1,A2, . . . ,An] | |
|---|---|
| =standard re-write=> | Enhanced Query[A1,A2, . . . An] |
| =ranking re-write=> | Enhanced Query[A1,A2, . . . An] AND(full(Ai) OR . . . |for all full(Ai) not mentioned in Enhanced Query[ ]) |

This approach has the advantage that it does not slow down the query processing in case of unranked queries. However, in case of high-frequency terms and large results, many access operations to the full posting index are necessary.

The second approach proposed in embodiment of the present invention is to add ranking information to the short posting lists of the index terms. In this approach, the weighted or unweighted term frequencies have to be computed at indexing time. Typically, one additional byte per document posting is required to hold the weighted or unweighted term frequency. In the case of highly frequent index terms, this approximately doubles the size of the short postings, therefore, slowing down the query processing for unranked queries. The advantage is that access to the full posting index is reduced to the absolute minimum.

In various other embodiments, obviously, there exist the options of generating several short posting indexes or maintaining dual short posting lists, one without the term frequencies for unranked query processing and one with the term frequencies for ranked queries. This allows the optimal choice to depend on the query type. The cost is that of a larger index, which therefore this becomes a trade-off.

Various embodiments of the present invention may be implemented as a method, system, or computer program product using standard programming and/or engineering techniques to produce software, firmware, hardware, or any combination thereof. The term "computer program product" (or alternatively, "article of manufacture") is used herein is intended to encompass a computer program accessible from any computer-readable device, carrier or media. In addition, the software in which various embodiments are implemented may be accessible through a transmission medium, for example, from a server over a network. The computer program product in which the code is implemented also encompasses transmission media, such as network transmission line and wireless transmission media. Thus the computer program product also comprises the medium in which the code is embedded. Those skilled in the art will recognize that many modifications can be made to this configuration without departing from the scope of the present invention.

The foregoing detailed description of various embodiments of the invention has been presented from the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A method for processing a text search query in a collection of documents,
   wherein a full posting index is generated, the full posting index comprising one or more first index terms and a full posting list for each first index term, enumerating occurrences of said first index terms in the documents of the collection; and
   wherein a text search query comprises one or more search conditions on search terms, said one or more search conditions being translated into one or more conditions on said one or more first index terms to provide one or more translated conditions;
   said method comprising:
   generating at least one short posting index comprising one or more second index terms and a short posting list for each second index term, enumerating the documents in which said one or more second index terms occur;
   generating one or more filter conditions and one or more complementary conditions to represent a full content of said one or more translated conditions, wherein said one or more filter conditions approximate said one or more translated conditions; and
   processing said one or more filter conditions using said short posting index and said one or more complementary conditions using said full posting index to provide a query result.

2. The method according to claim 1 wherein said one or more second index terms of said short posting index comprises a pre-computed subquery.

3. The method according to claim 1 wherein said one or more second index terms comprise a precomputed subquery comprising at least one or a combination of a single word, a phrase, a proximity condition and a field condition.

4. The method according to claim 2 wherein a cost for computing said sub-query as 2 part of a text search query is considered when choosing said sub-query as index term in the short posting index.

5. The method according to claim 2 wherein an evaluation of previous text search queries is considered when choosing said sub-query.

6. The method according to claim 1 wherein each full posting list of said full posting index is considered as a sequence of indexed blocks to quickly address defined parts of said full posting list.

7. The method according to claim 6 wherein each short posting list of said short posting index is considered as a sequence of indexed blocks to quickly address defined parts of said short posting list.

8. The method according to claim 1 wherein for said one or more translated conditions of said text search query a filter of one or more Boolean conditions is generated; wherein said one or more Boolean conditions are processed using said short posting index to obtain a reduced set of documents to be searched and to identify relevant parts of said full posting index; and wherein said one or more complementary conditions are processed by accessing only the relevant parts of said full posting index.

9. The method according to claim 1 wherein said short posting index is used for ranking resulting documents of said text search query.

10. The method according to claim 8 wherein information ranking the resulting documents of said text search query is extracted from said full posting index by accessing only the relevant parts of said full posting index.

11. The method according to claim 9 wherein said ranking takes into account proximity conditions being said one or more second index terms of said short posting index.

12. The method according to claim 9, wherein said short posting index further comprises information about a weighted index term frequency in each document of said collection.

* * * * *